US010830650B2

(12) United States Patent
Friedrichs et al.

(10) Patent No.: US 10,830,650 B2
(45) Date of Patent: Nov. 10, 2020

(54) CALIBRATOR SLEEVE AND BLOCK CALIBRATOR FOR CALIBRATION OF A TEMPERATURE SENSOR

(71) Applicant: SIKA Dr. Siebert & Kühn GmbH & Co. KG, Kaufungen (DE)

(72) Inventors: René Friedrichs, Göttingen (DE); Sergius Schmidt, Kassel (DE); Frank Trinter, Kaufungen (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 232 days.

(21) Appl. No.: 16/031,078

(22) Filed: Jul. 10, 2018

(65) Prior Publication Data

US 2019/0017881 A1 Jan. 17, 2019

(30) Foreign Application Priority Data

Jul. 11, 2017 (DE) .................. 10 2017 115 491

(51) Int. Cl.
*G01K 15/00* (2006.01)

(52) U.S. Cl.
CPC ......... *G01K 15/002* (2013.01); *G01K 15/005* (2013.01)

(58) Field of Classification Search
CPC ...... G01J 5/522; G01J 2005/0048; G01J 5/52; G01K 15/002; G01K 15/00; G01K 15/005; G01K 15/007; G01N 25/18
USPC ........................ 374/1–3, 100, 129
See application file for complete search history.

(56) References Cited

U.S. PATENT DOCUMENTS

| 6,193,411 | B1 | 2/2001 | Chen | |
|---|---|---|---|---|
| 7,534,028 | B2 * | 5/2009 | Jussel | G01K 15/002 374/1 |
| 7,677,794 | B2 * | 3/2010 | Kim | G01K 15/002 374/1 |
| 8,801,271 | B2 * | 8/2014 | Harslund | G01K 15/00 374/1 |
| 2007/0206653 | A1 * | 9/2007 | Nakano | G01K 15/005 374/1 |
| 2007/0291814 | A1 * | 12/2007 | Hirst | G01K 15/005 374/1 |
| 2008/0013591 | A1 * | 1/2008 | Kim | G01K 15/002 374/1 |

FOREIGN PATENT DOCUMENTS

| DE | 102008034361 B4 | | 2/2011 |
|---|---|---|---|
| EP | 2793008 A1 | | 10/2014 |
| GB | 2435691 A | | 9/2007 |
| JP | 02007248277 A | * | 9/2007 |
| JP | 2007248277 A | | 9/2007 |
| KR | 101348603 B1 | * | 2/2014 |
| WO | 2010040360 A1 | | 4/2010 |

OTHER PUBLICATIONS

JP02007248277A, translation, Sep. 2007.*

* cited by examiner

*Primary Examiner* — Gail Kaplan Verbitsky
(74) *Attorney, Agent, or Firm* — Dinsmore & Shohl LLP

(57) ABSTRACT

A block calibrator for calibrating a temperature sensor includes a calibrator sleeve having at least one sensor bore into which the temperature sensor is insertable along a longitudinal direction. The calibration sleeve also includes a body having at least two sections having different thermal conductivities.

10 Claims, 3 Drawing Sheets

CALIBRATOR SLEEVE AND BLOCK CALIBRATOR FOR CALIBRATION OF A TEMPERATURE SENSOR

CROSS-REFERENCE TO RELATED APPLICATIONS

This application claims priority to German application no. DE 10 2017 115 491.4 filed Jul. 11, 2017; which is incorporated herein by reference.

FIELD OF INVENTION

The invention relates to a calibrator sleeve for a block calibrator for calibrating a temperature sensor and to a block calibrator comprising said calibrator sleeve, wherein the calibrator sleeve has at least one sensor bore into which the temperature sensor can be inserted along a longitudinal direction.

BACKGROUND

DE 10 2008 034 361 B4, for example, discloses a block calibrator for calibrating a temperature sensor having a heating block in which heating means are arranged to bring the heating block to a specified temperature. A reception hole is introduced into the heating block into which the calibrator sleeve can be inserted and the calibrator sleeve has a sensor bore into which a temperature sensor serving as a test specimen can be introduced. The calibrator sleeve is formed in one piece and a heat flow can take place in the longitudinal direction of the calibrator sleeve that also produces inhomogeneities within the calibration region of the calibrator sleeve. The calibration region is here that region which is formed in the longitudinal direction and over which the temperature sensor can measure a temperature when it is introduced into the calibrator sleeve. The calibration region thus forms a section of the calibrator sleeve in the longitudinal direction and the more uniform the temperature is distributed over the calibration region in the calibrator sleeve, the more exactly the temperature sensor can be calibrated.

WO 2010/040360 A1 discloses a block calibrator for receiving a calibrator sleeve in which a temperature sensor can be calibrated. To increase the calibration accuracy, a plurality of heating elements are provided that are introduced into the heating block and that should generate a temperature distribution in the heating block that is as homogeneous as possible. In addition, a plurality of temperature sensors are introduced into the heating block with which a temperature profile can be recognized in the heating block to set the temperature as homogeneously as possible in the heating block. A considerable construction effort thus results for providing a precisely calibrating block calibrator that results in high manufacturing costs.

SUMMARY OF THE INVENTION

The object of the invention is the further development of a calibrator sleeve and of a block calibrator so that the calibrator sleeve has a small temperature inhomogeneity in operation where possible. A calibration section having a particularly high temperature homogeneity should in particular be provided in the calibrator sleeve. This object is achieved by the respective characterizing features starting from a calibrator sleeve in accordance with the description herein and starting from a block calibrator in accordance with the description herein. Advantageous further developments of the invention are set forth herein.

The invention includes the technical teaching that the body of the calibrator sleeve has at least two sections having different thermal conductivities.

The basic idea of the invention is the configuration of the calibrator sleeve with sections of different thermal conductivities so that a first section having a high conductivity can be provided in which a high temperature homogeneity results on the basis thereof and at least one second section is provided in which a low thermal conductivity is present to avoid a cooling, in particular a unilateral or asymmetrical cooling, of the first section having the high thermal conductivity.

The idea of the invention is in particular that the body of the calibrator sleeve has a first section having a material of a first, in particular high, conductivity and at least one second section having a material of a second, in particular low, conductivity. The first section having the higher conductivity can here form a calibrating section and the second section adjoins the calibration section in the longitudinal direction and forms a connecting section that has a lower conductivity and/or that is formed from a material having a lower thermal conductivity.

The material of the higher thermal conductivity and the material of the lower conductivity can comprise different chemical base elements, with it also being conceivable that an identical material is provided in different manufacturing modes for the different thermal conductivities. For example, a section having the high thermal conductivity can be formed from a solid metal material, for example manufactured in a casting process or in a pressing process, and the section having the low thermal conductivity can comprise an identical material, but be based on a different mode of manufacture. There is, for example, the possibility of manufacturing a section having a lower thermal conductivity from a melt foam or of utilizing different modes of manufacture that enable a lower density otherwise having the same chemical composition of the material. If, for example, a first section of a high thermal conductivity is provided in a conventional manner from a solid material, a second section can adjoin the first section and can be formed by means of a metal foam or is manufactured from a material by a method of, for example, selective laser sintering. Both the calibration section and the connecting section can thus comprise an identical material; however, the sections are characterized by different thermal conductivities.

An advantageous embodiment of the calibrator sleeve provides that the material for forming the calibration section comprises aluminum and/or at least an aluminum alloy and/or copper; and or that the material for forming the connecting section at least partially comprises steel and/or stainless steel.

Provision can in particular be made that the connecting section of the calibrator sleeve comprises at least one cut-out that is filled with air or evacuated. The section with the lower thermal conductivity can consequently also be formed by an air section or an evacuated section, with the total amount of the calibrator sleeve within which the sections of the different thermal conductivities are produced terminating in each case, viewed in the longitudinal direction, with a solid body section. Recesses in the base region or a reception hole in the upper region of the calibrator sleeve for receiving at least one temperature sensor are not included in the differently configured thermal conductivities in the sense of the invention. The calibrator sleeve in particular terminates both at the base side and at the top side in each case with a solid body section, with the regions having the different thermal conductivities only being formed between the termination at the base side and the termination at the top side and with the termination at the base side and the termination at the top side being formed by a solid body of the calibrator sleeve and not, for instance, by an air-filled recess.

To generate a temperature within the calibration section that is as homogeneous as possible, provision is further advantageously made that a respective section having a lower thermal conductivity is formed at both sides of the calibration section with respect to the longitudinal direction of the calibrator sleeve. In other words, the calibration section does not form a lower part of the calibrator sleeve that stands in the reception hole of the block calibrator at the base side since an asymmetrical cooling of the calibration section would in turn thereby be the consequence. It is rather the case that at least one connecting section having a lower thermal conductivity adjoins the calibration section at the base side. The same applies in the direction toward the upper side of the calibrator sleeve in which direction a substantial connecting section adjoins the calibration section, said connection section having the lower thermal conductivity. A cooling of the calibration section in the direction toward the opening side of the sensor bore is consequently minimized.

The body of the calibrator sleeve is preferably cylindrical, with the body being able to comprise cylinder sections that are formed with different diameters. It is in particular advantageous that the body of the calibrator sleeve has a smaller diameter in the calibration section than in at least one connecting section. The receiving hole in the heating block of the block calibrator is formed as cylindrical in a manner known per se and has a uniform diameter and, if the calibrator sleeve is formed with a smaller diameter at least in the calibration section, a peripheral annular gap is produced between the calibration section and the reception hole. The annular gap is accompanied by a smaller heat transfer from the heating block to the calibrator sleeve, whereby the temperature homogeneity is in particular further improved in the longitudinal direction of the calibrator sleeve over the length of the calibration section.

In a preferred embodiment, the calibrator sleeve is formed from a plurality of cylinder sections that are formed by solid material and have to be connected to one another. Provision can consequently be made that the calibration section and the connecting section are connected to one another by means of a threaded connection or by means of an interference fit assembly. It is also conceivable that the calibration section and the connecting section are connected to one another by means of at least one screw element or by means of a plastically deformed material region of at least one of the materials. A further advantage arises through an insulation layer between the calibration section and the connecting section, for example in the form of a ceramic plate or the like.

The invention is further directed to a block calibrator for calibrating a temperature sensor comprising a heating block at or in which at least one heating means is arranged, and wherein the heating block has a reception hole for receiving a calibrator sleeve, with the calibrator sleeve having at least one sensor bore into which the temperature sensor can be inserted along a longitudinal direction. In accordance with the invention, the body of the calibrator sleeve has at least two sections having differing thermal conductivities. The further features and associated advantages that are listed above in connection with the calibrator sleeve are likewise used for the block calibrator comprising said calibrator sleeve.

The block calibrator and specifically the reception hole are in particular configured such that with a calibrator sleeve inserted into the reception hole, the calibration section corresponds to the arrangement of the heating means with respect to the longitudinal direction. This means that the heating means has a height in the longitudinal direction that starts and ends at the height of the calibration section.

DETAILED DESCRIPTION OF THE DRAWINGS

Figure 1:
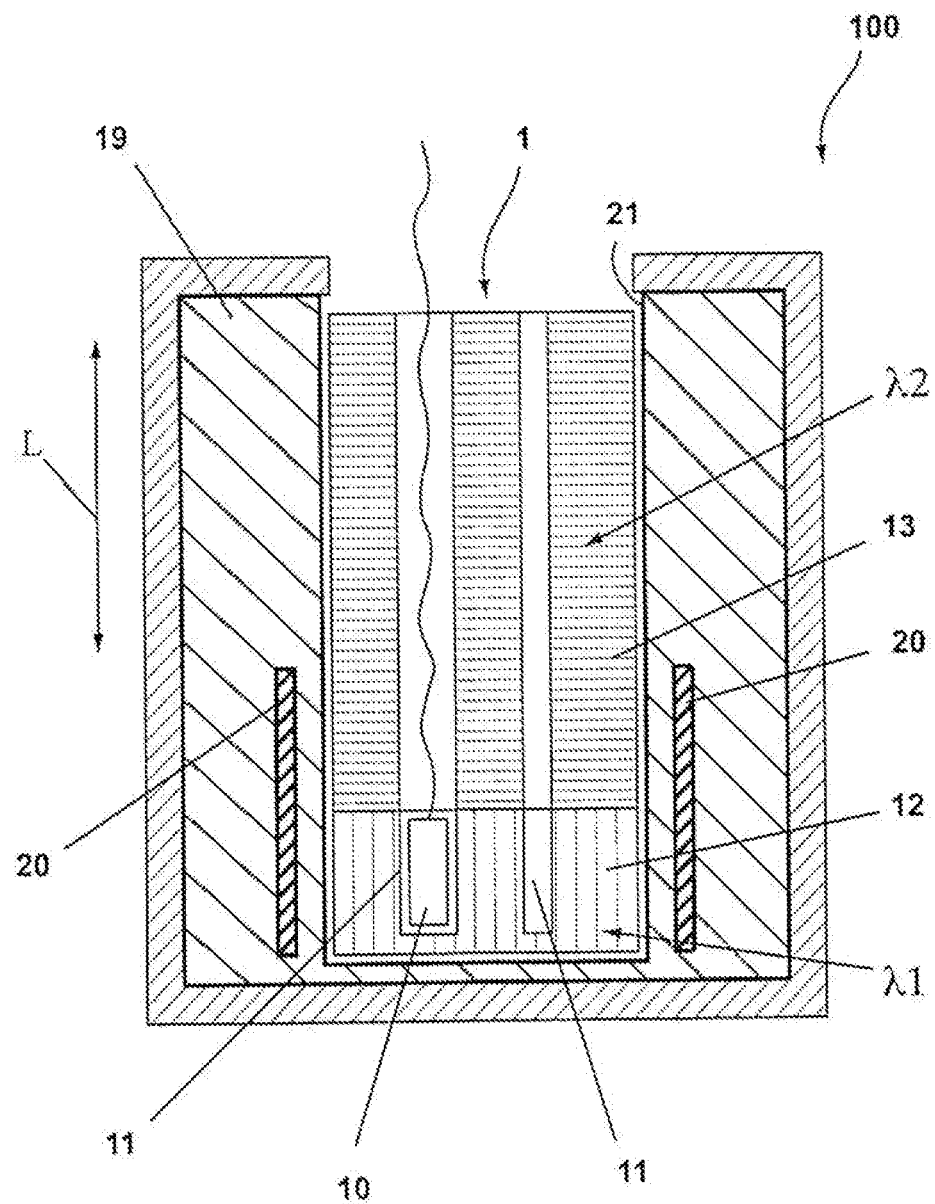
FIG. 1 is a total view of a block calibrator comprising a calibrator sleeve configured in accordance with the invention.

FIG. 1 shows a block calibrator 100 in a cross-section in a schematized representation. The block calibrator 100 has a heating block 19 as a base body and a reception hole 21 into which a calibrator sleeve 1 is inserted is introduced in the heating block 19. The reception hole 21 is configured as a bore, without the manufacture of the reception hole 21 having to be produced by means of a drilling process, and the reception hole 21 has a base region that terminates the reception hole 21 downwardly in a longitudinal direction L of the reception hole 21. The calibrator sleeve 1 is inserted into the reception hole 21 such that the former stands up at the base side or is held spaced apart from the base surface by corresponding means. The same applies in the radial direction so that only by way of example a peripheral gap is shown between the calibrator sleeve 1 and the reception hole 21.

The embodiment shows the calibrator sleeve 1 in a cylindrical shape and, starting from the upper side, two sensor bores 11 are introduced into the calibrator sleeve 1, with a temperature sensor 10 being inserted in the left sensor bore 11. A reference sensor, not shown, can be inserted into the right sensor bore 11, for example.

A heating means 20 is arranged by way of example in the heating block 19 and the heating means 20 can be formed by a heating cuff that surrounds the reception hole 21 in the manner of a sleeve in the lower region close to the base. If the heating means 20 is switched on, it heats the heating block 19 and the heat is transmitted from the heating block 19 to the calibrator sleeve 1 and consequently also to the temperature sensor 10.

In accordance with the invention, the body of the calibrator sleeve 1 has at least two sections having different thermal conductivities $\lambda 1$ and $\lambda 2$. The body here has a first section that forms a calibration section 12 and the calibration section has a higher conductivity $\lambda 1$ than a further section that is configured as a connecting section 13. $\lambda 1$ is thus larger than $\lambda 2$.

If the heating means 20 is now switched on and heats the calibrator sleeve, the calibration section 12 can develop a substantially homogeneous temperature so that a minimal or no temperature gradient results in the longitudinal direction L. A smaller heat dissipation takes place due to the lower thermal conductivity $\lambda 2$ of the connecting section 13 and a substantially uniform temperature is adopted over the height of the calibration section 12 in the longitudinal direction L due to the smaller heat dissipation. Measurement errors are thereby reduced, in particular when the temperature 10 senses temperatures over a larger longitudinal section.

The calibration section 12 is formed from a first material having a higher thermal conductivity $\lambda 1$ and the connecting section 13 is formed from a material having a lower thermal conductivity $\lambda 2$. The calibration section 12, for example, comprises aluminum and the connecting section 13 comprises a stainless steel. The two sections 12 and 13 can each form cylindrical bodies that are connected to one another so that in the longitudinal direction L the connecting section 13 adjoins the calibration section 12 upwardly with respect to the reception hole 21, i.e. in the direction toward the opening of the reception hole 21.

The basic idea of the invention comprises the connecting section 13 of the lower conductivity $\lambda 2$ so-to-say insulating the calibration section 12 within the reception hole 21. Due to the lower thermal conductivity $\lambda 2$, the open face end of the connecting section 13 in the opening of the reception hole 21 produces a smaller thermal outflow caused by convection and as a consequence a more constant temperature is adopted within the volume of the calibration section 12.

FIGS. 2, 3, 4, and 5 show different embodiments of the calibrator sleeve 1 having a lower-side calibration region 12 and a connecting section 13 adjoining at the upper side, with the sections 12 and 13 being permeated by sensor bores 11. Temperature sensors 10 in accordance with FIG. 1 can be inserted into the sensor bores 11, with the measuring section of the temperature sensor 10 being arranged within the calibration section 12 in the inserted state.

Figure 2:
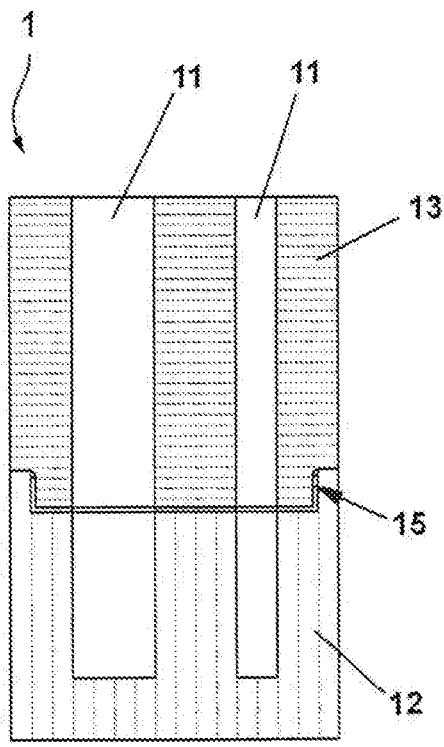
FIG. 2 is a calibrator sleeve with a screw connection between a calibration section and a connecting section.

FIG. 2 shows a connection between the calibration section 12 and the connecting section 13 in the form of a threaded connection 15 and the calibration section 12 has a collar for this purpose that engages over a section of the connecting section 13 having a reduced diameter. The threaded connection 15 is formed in the section that engages over so that the calibration section 12 and the connecting section 13 can be screwed together. The manufacture of the calibrator sleeve can take place here such that in the screwed together state of the sections 12 and 13, the sensor bores 11 are only subsequently introduced.

Figure 3:
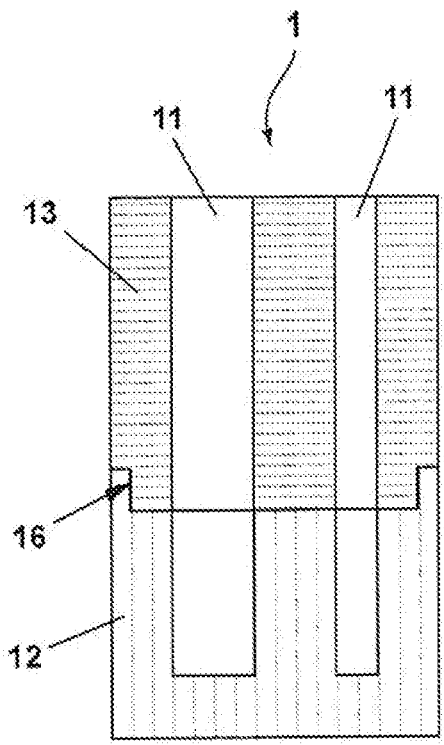
FIG. 3 is a calibrator sleeve with an interference fit assembly between the calibration section and the connecting section.

FIG. 3 shows a connection between the calibration section 12 and the connecting section 13 in the form of an interference fit assembly 16 so that a section of the connecting section 13 is pressed into a collar of the calibration section 12 at the inner side.

Figure 4:
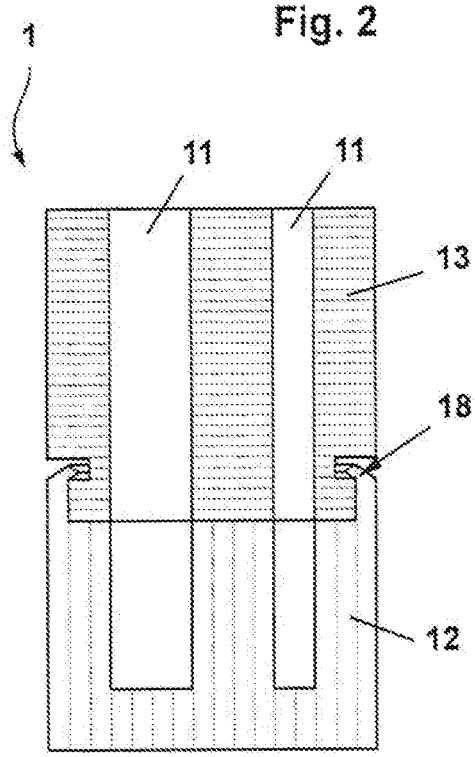
FIG. 4 is a calibrator sleeve with a plastically deformed material region for forming a shape match between the calibration section and the connecting section.

FIG. 4 represents a further connection form between the calibration section 12 and the connecting section 13 in the form of a plastically deformed material section 18 that forms a shape-matched connection. The material region 18 can be shaped into an associated geometry in a rolling process in the connecting section 13 by a rolling procedure or by a crimping procedure.

Figure 5:
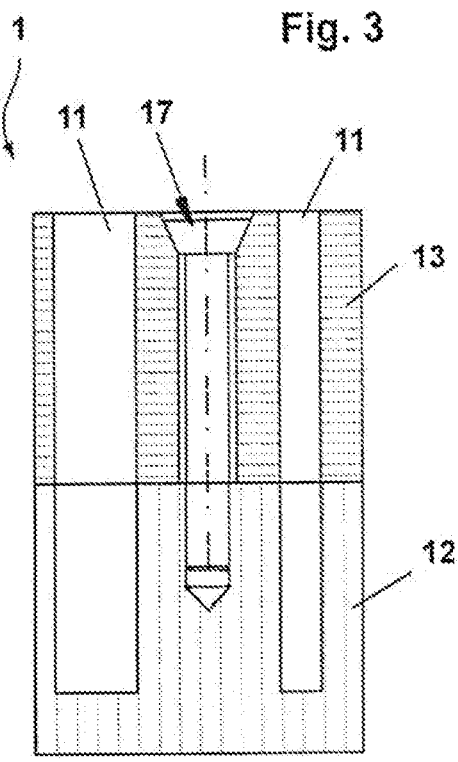
FIG. 5 is a calibrator sleeve with a screw element for connecting the calibration section and the connecting section.

FIG. 5 finally shows a connection between the calibration section 12 and the connecting section 13 that is formed by means of a screw element 17 that is introduced into the connecting section 13 and is screwed in the calibration section 12.

Further possibilities comprise the formation of a connection with material continuity between the calibration section 12 and the connecting section 13 so that they can be adhesively bonded, soldered, or welded to one another in the joining zone provided that the material selection of the calibration section 12 or of the connecting section 13 permits such joining processes with material continuity.

Figure 6:
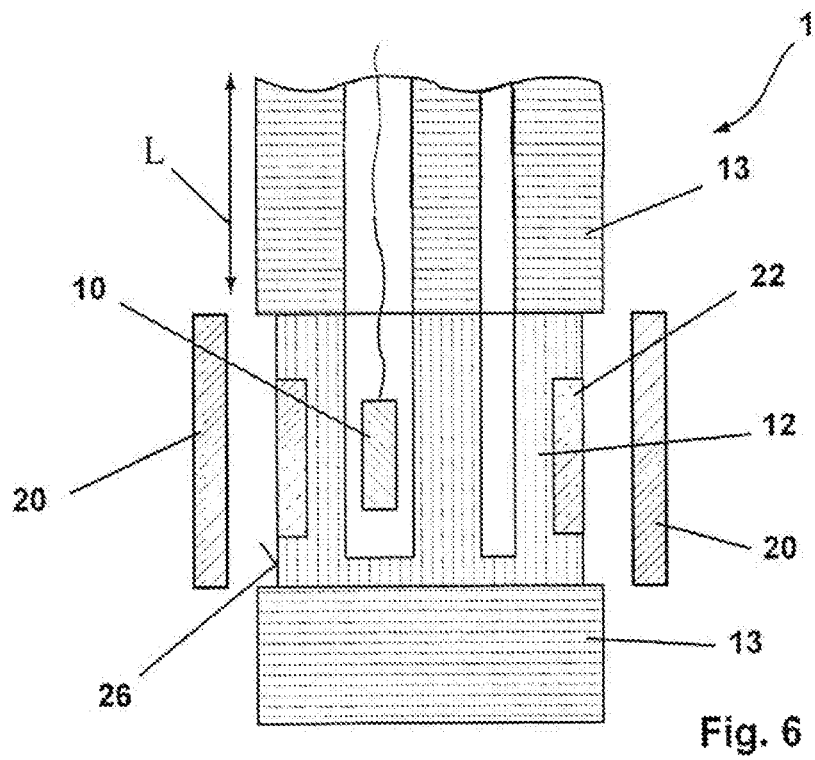
FIG. 6 is a further embodiment of a calibrator sleeve with connecting sections arranged at both sides of the calibration section.

FIG. 6 shows a further embodiment of a calibrator sleeve 1 having a calibration section 12 in which a temperature sensor 10 is introduced by way of example. A connecting section 13 adjoins the calibration section 12 both at the upper side and at the lower side in the longitudinal direction L. The connecting section 13 having the lower thermal conductivity with respect to the calibration section 12 thus produces an insulation of the calibration section 12 at both sides. The jacket surface 26 of the calibration section 12 has a reduced diameter with respect to the connecting sections 13 and the heating means 20 are furthermore shown by way of example that have a length in the longitudinal direction L that corresponds to the length of the calibration section 12 in the longitudinal direction L. A cuff 22 for insulation is introduced in the jacket surface 26 and, if the heating means 20 heats the calibration section 12 by a radially inwardly directed thermal flow, a uniform temperature profile can be formed by the thermally insulting cuff 22 over the longitudinal extent of the longitudinal direction L in the calibration section 12.

Figure 7:
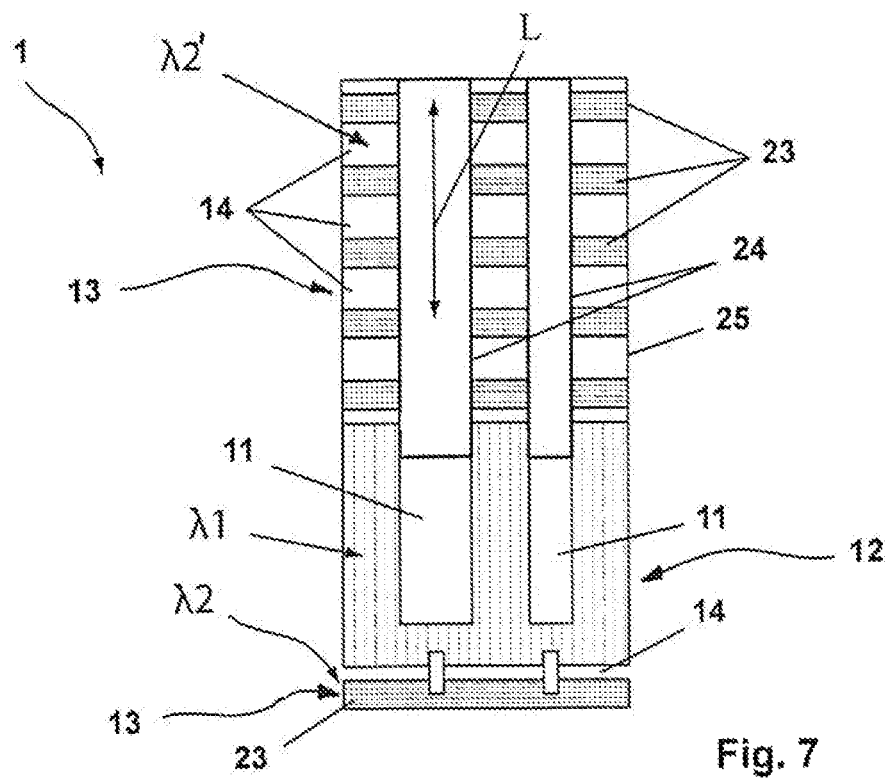
FIG. 7 is a further embodiment of a calibrator sleeve having plate elements for forming connecting sections.

FIG. 7 shows a further alternative embodiment of the calibrator sleeve 1 having a calibration section 12 and having two connecting sections 13 that adjoin the calibration section 12 at the upper side and at the lower side in the longitudinal direction L. The connecting sections 13 are constructed from plate elements 23 between which cut-outs 14 are formed that are filled with air or can be evacuated. For the evacuation, the connecting section 13 can be formed with an envelope 25 that can be evacuated and so that the cut-outs 14 are airless. A second thermal conductivity $\lambda 2'$ is consequently formed in the cut-outs 14, said thermal conductivity being formed by the thermal conductivity of air or of a vacuum. The plate elements 23 in the embodiment shown can comprise the same material as also the calibration section 12 or the plate elements 23 comprise a material having a lower thermal conductivity $\lambda 2$ with respect to the higher conductivity $\lambda 1$ of the calibration section 12.

Sleeves 24 are shown by way of example for the construction of and for a holding arrangement of the plate elements 23 and form the sections of the sensor bores 11 over the height of the connecting section 13. The sleeves 24 can, for example, be pressed section-wise into the sensor bores 11 in the calibration section 12.

The invention is not restricted in its design to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

REFERENCE NUMERAL LIST 100 block calibrator
1 calibrator sleeve
10 temperature sensor 11 sensor bore
12 calibration section
12 connecting section
14 cut-out
15 threaded connection
16 interference fit assembly
17 screw element
18 plastically deformed material region
19 heating block
20 heating means
21 reception hole
22 cuff
23 plate element
24 sleeve
25 envelope
26 jacket surface
L longitudinal direction
$\lambda 1$ first thermal conductivity
$\lambda 2$ second thermal conductivity
$\lambda 2'$ second thermal conductivity

The invention claimed is:

1. A calibrator sleeve for a block calibrator for calibrating a temperature sensor, comprising:
    a body having a first section and at least one second section, the first section having a higher thermal conductivity than the at least one second section, the first section forming a calibration section, the at least one second section adjoining the calibration section in a longitudinal direction and forming at least one connecting section; and
    at least one sensor bore disposed within the body into which the temperature sensor is insertable along the longitudinal direction.

2. A calibrator sleeve in accordance with claim 1, wherein the first section comprises a material of a first thermal conductivity and the at least one second section comprises a material of a second thermal conductivity.

3. A calibrator sleeve in accordance with claim 2, wherein the material forming the calibration section comprises aluminum and/or aluminum alloys and/or copper and the material of the at least one connecting section at least partially comprises steel and/or stainless steel.

4. A calibrator sleeve in accordance with claim 1, wherein the at least one connecting section of the calibrator sleeve comprises at least one cut-out that is filled with air or evacuated.

5. A calibrator sleeve in accordance with claim 1, wherein a section having a lower thermal conductivity than the first section is formed at both sides of the calibration section with respect to the longitudinal direction of the calibrator sleeve.

6. A calibrator sleeve in accordance with claim 1, wherein the body of the calibrator sleeve is cylindrical and has a smaller diameter in the calibration section than in the at least one connecting section.

7. A calibrator sleeve in accordance with claim 1, wherein the calibration section and the at least one connecting section are connected to one another by means of a threaded connection or by means of an interference fit assembly.

8. A calibrator sleeve in accordance with claim 2, wherein the calibration section and the at least one connecting section are connected to one another by means of at least one screw element or by means of a plastically deformed material section of at least one of the materials.

9. A block calibrator for calibrating a temperature sensor, comprising:
    a heating block having a reception hole for receiving a calibrator sleeve;
    at least one heater is arranged at or in the heating block;
    the calibrator sleeve having at least one sensor bore into which the temperature sensor is insertable along a longitudinal direction, the calibrator sleeve having a body, the body having a first section and at least one second section, the first section having a higher thermal conductivity than the at least one second section, the first section forming a calibration section, the at least one second section adjoining the calibration section in a longitudinal direction and forming at least one connecting section.

10. A block calibrator in accordance with claim 9, wherein with the calibrator sleeve inserted into the reception hole, the calibration section corresponds to an arrangement of a heater with respect to the longitudinal direction.

* * * * *